(12) United States Patent
Shepston

(10) Patent No.: US 6,570,930 B2
(45) Date of Patent: *May 27, 2003

(54) THREE-STATE DIFFERENTIAL DATA TRANSMISSION WITH SELF LATCHING ABILITY

(75) Inventor: Shad R. Shepston, Loveland, CO (US)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 24 days.

(21) Appl. No.: 09/067,382

(22) Filed: Apr. 27, 1998

(65) Prior Publication Data

US 2001/0040929 A1 Nov. 15, 2001

(51) Int. Cl.[7] ................................................. H04K 1/02
(52) U.S. Cl. ..................................................... 375/295
(58) Field of Search ................................. 375/288, 287, 375/259, 257, 286; 327/40, 50, 52, 63

(56) References Cited

U.S. PATENT DOCUMENTS

| | | | | |
|---|---|---|---|---|
| 4,128,811 A | * | 12/1978 | Englund, Jr. | 327/42 |
| 5,384,769 A | * | 1/1995 | Oprescu et al. | 375/286 |
| 5,760,626 A | * | 6/1998 | Pelley, III | 327/207 |
| 5,977,797 A | * | 11/1999 | Gasparik | 326/86 |

* cited by examiner

Primary Examiner—Chi Pham
Assistant Examiner—Kevin M Burd
(74) Attorney, Agent, or Firm—Alex J. Neudeck

(57) ABSTRACT

Digital data transmission using three logic states on a differential pair of signal lines. The three states are: a first line a threshold higher than a second line, the second line a threshold higher than the first line, and when both lines are approximately equal. The presence of three states allows the receiving circuit to recognize the beginning and end of a valid data bit. A receiving circuit using two comparators to generate strobes for latching the data is also disclosed. The strobes also clock a counter whose output is fed to a decoder. The output of the decoder is used to select one of N latches that are used to latch the incoming data.

10 Claims, 3 Drawing Sheets

THREE-STATE DIFFERENTIAL DATA TRANSMISSION WITH SELF LATCHING ABILITY

FIELD OF THE INVENTION

The present invention relates generally to the electronic transmission of digital data and more particularly to the transmission of digital data between two or more devices or integrated circuits.

BACKGROUND OF THE INVENTION

In electronic devices using digital logic, digital data must be communicated from one circuit to another. This communication may take many forms including computer to computer, PC board to PC board, chip to chip, and between circuits on the same chip. As digital electronics have gotten faster, the speed at which these circuits communicate has increased. To communicate at these increased bandwidths, the time that data can be held valid on a given signal is decreased. As the data valid time is decreased, timing differences between these separate signals become large relative to the time data is valid on those signals. If one of these signals is a clock or other signal whose relationship to another signal is critical for proper communication, erroneous or incorrect data may be latched into the receiving circuit.

Accordingly, there is a need in the art for an improved method of communicating digital data that increases the length of time available for a circuit to read data without reducing the amount of data communicated. To ensure broad application, it is desirable that this method be adaptable to different data rates and timing differences. Finally, it is desirable that this method be adaptable to different circuit technologies and environments.

SUMMARY OF THE INVENTION

In a preferred embodiment, the invention transfers data using three logic states on a differential pair of wires. The three states are: a first line a threshold higher than a second line, the second line a threshold higher than the first line, and when both lines are approximately equal. The presence of three states allows the receiving circuit to recognize the beginning and end of a valid data bit.

In a preferred embodiment, two states are used to generate two strobes. One strobe will be active when the first line is greater than the second and the other strobe will be when the second line is greater than the first. When both lines are approximately equal, neither strobe is active. The strobes are used to increment a counter, and latch in a logical high or a logical low depending on which strobe is active. The counter is used to determine which register is to latch in the logical high or the logical low. This allows the register to hold the logical high or logical low for N times as long, where N is the number of registers used to hold data received via this pair of differential wires.

DETAILED DESCRIPTION OF THE PREFERRED EMBODIMENTS

Figure 1:
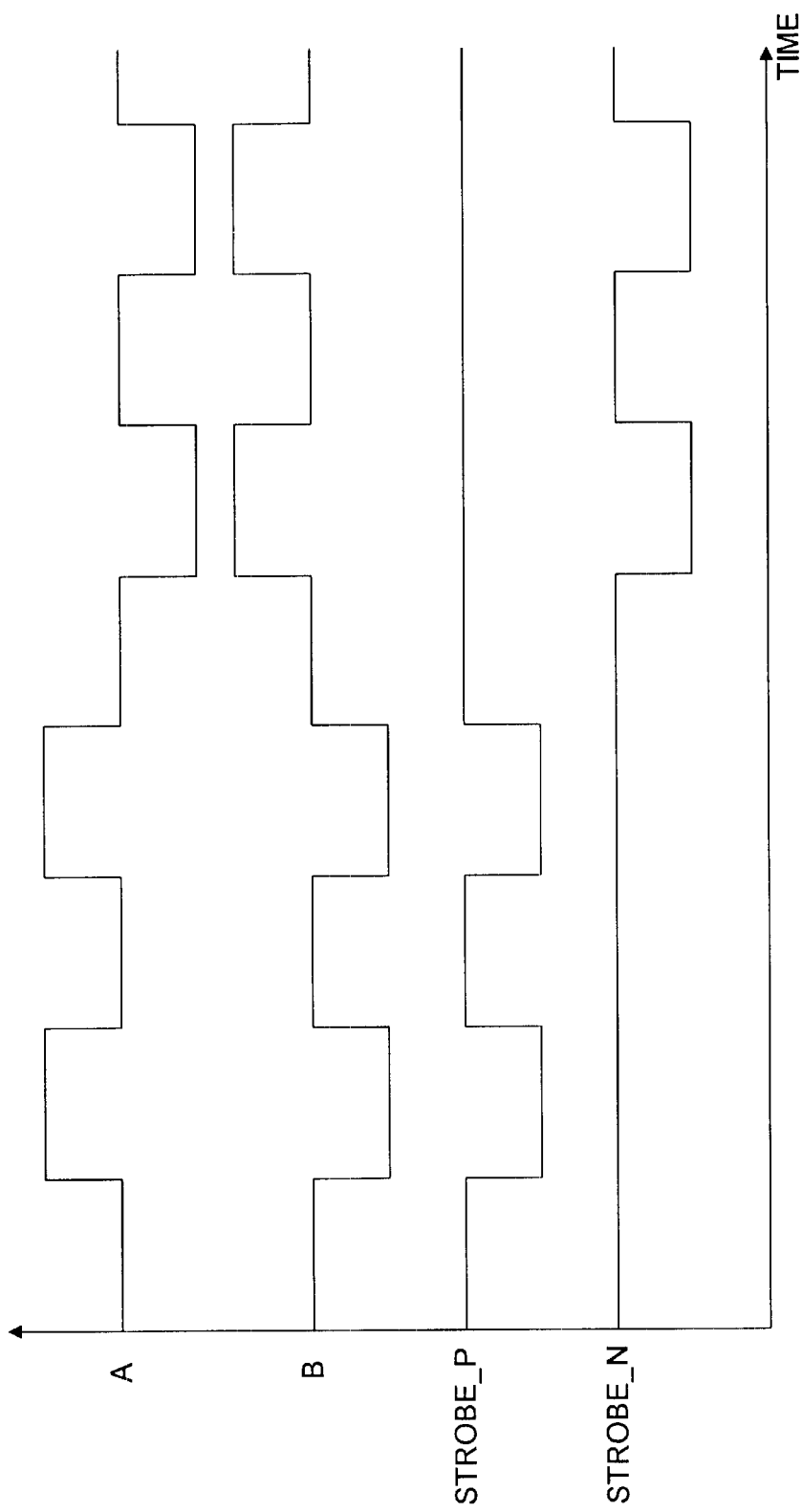
FIG. 1 is a timing diagram illustrating an embodiment of the three-state differential data transfer and strobes.

FIG. 1 is a timing diagram showing an embodiment of the three-state differential data transfer. The differential data lines are labeled A and B. Exemplary signals on A and B are shown plotted verses time. The signals on A and B may be either voltage changes, or current changes. In the preferred embodiment, they are voltage changes.

In FIG. 1, the signals on A and B return to an intermediate state after each data bit is sent. While each data bit is being sent, the signals on A and B are driven in opposite directions. If A is driven more positive, then B is driven more negative and visa versa. When these signals reach the receiving circuit, the receiving circuit detects the signal differential, and the polarity of that differential and uses that information to latch a 1 or a 0. The fact that there is a signal differential indicates that a data bit is being sent. This information may be used to generate a strobe, or clock that latches the data bit being sent. The polarity of the signal differential indicates the value of that bit.

An embodiment showing the generation of a strobe for latching a 1 and a separate strobe for latching a 0 are shown. When the signal on line A is higher than the signal on line B, an active low strobe is generated called STROBE_P. This signal may be used to set a flip-flop to a logical 1. This, in essence, latches in a data bit with a value of 1. When the signal on line b is higher than the signal on line a, an active low strobe is generated called STROBE_N. This signal may be used to set a flip-flop to a logical 0. This, in essence, latches in a data bit with a value of 0.

As stated above, if A is driven more positive, then B is driven more negative and visa versa. Other possibilities are to keep one line the same and drive the other. The non-driven line could be kept at an intermediate level, or at a logical 1 or 0. Both of these would create the necessary signal differential, and equality on A and B. The embodiment shown, however, has the advantage over these other options in that each line is driven with less signal strength (which is easier to do) but still produces a maximum amount of differential signal at the receiving end (which is easier to detect reliably, especially when there is noise on the lines).

Figure 2:
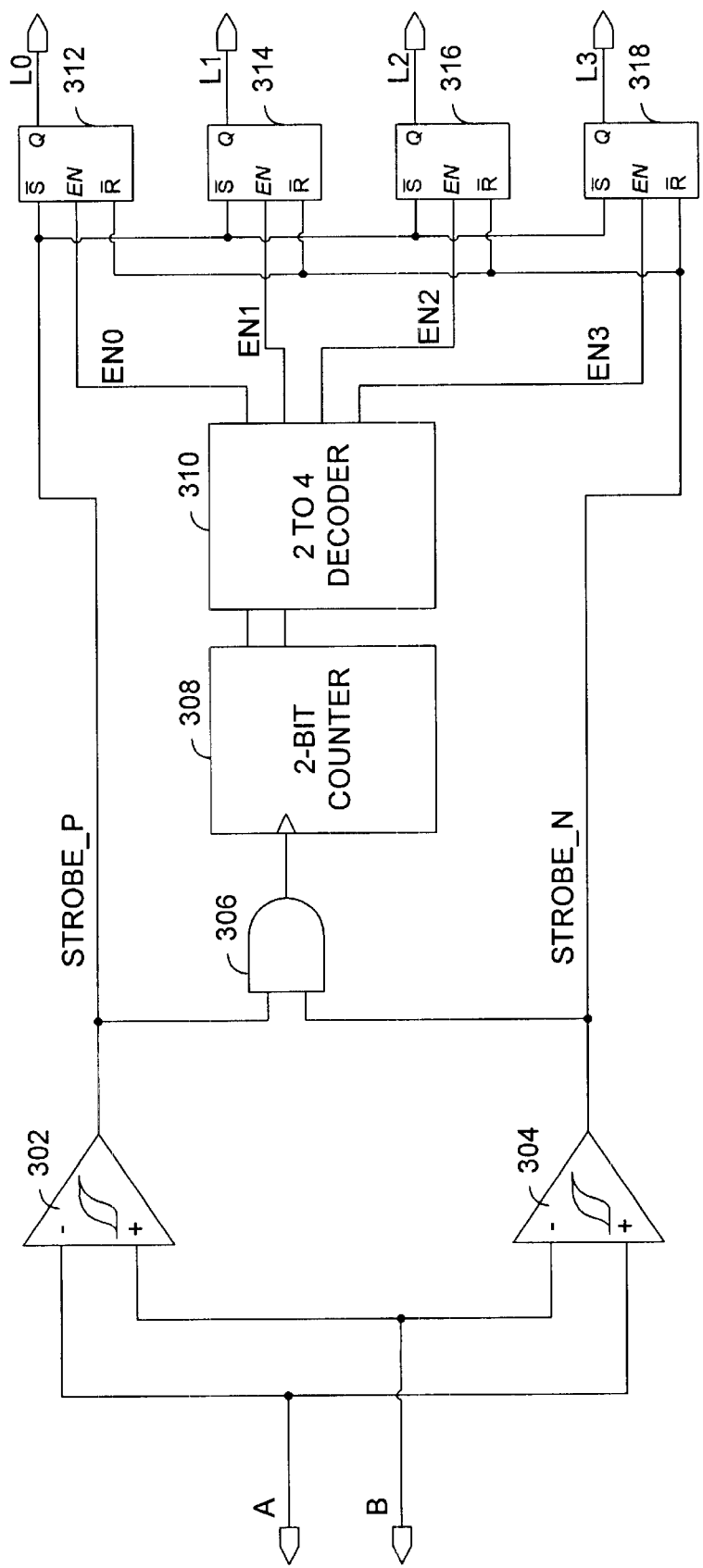
FIG. 2 is a schematic illustration of an embodiment that may be used to receive the three-state data.

FIG. 2 is a schematic illustration of an embodiment that may be used to receive the three-state data. The input to the circuit are the signal lines A and B. A is coupled to the inverting input of comparator 302 and the non-inverting input of comparator 304. B is coupled to the non-inverting input of comparator 302 and the inverting input of comparator 304. The output of comparator 302 is the signal STROBE_P. The output of comparator 304 is signal STROBE_N.

Comparators 302 and 304 have a specified threshold voltage, $V_t$. This threshold voltage prevents the outputs of comparators 302 and 304 (STROBE_P and STROBE_N, respectively) from changing from a high state to a low state unless the inverting input of that comparator is at least $V_t$ volts higher than the non-inverting input. This ensures that STROBE_P and STROBE_N are both high when the signal differential between A and B is less than $V_t$.

STROBE_P and STROBE_N are each connected to one input of AND gate 306. The output of AND gate 306 is connected to the clock input of two-bit counter 308. When the output of AND gate 306 goes high as either STROBE_P or STROBE_N returns high, counter 308 increments its output. The output of counter 308 rolls-over to 00 when incremented from 11. The output of counter 308 is coupled to the input of 2-to-4 decoder 310. The output of decoder 310 is four enable lines, EN0, EN1, EN2, and EN3. Only one of these lines is active at a time. The line that is active is determined by the value input to the decoder 310 by counter 308. The enable lines EN0, EN1, EN2, and EN3 are coupled to the enable inputs of flip-flops 312, 314, 316, and 318, respectively. This means that at any given time, only one of flip-flops 312, 314, 316, and 318, can be set or reset.

STROBE_P is coupled to the set input of each of flip-flops 312, 314, 316, and 318. STROBE_N is coupled to the reset input of each of flip-flops 312, 314, 316, and 318. Accordingly, when STROBE_P fires, (goes low) it will cause the one flip-flop of flip-flops 312, 314, 316, and 318 selected by the one signal of EN0, EN1, EN2, and EN3 that is active to be set to a 1. Likewise, when STROBE_N fires, (goes low) it will cause the one flip-flop of flip-flops 312, 314, 316, and 318 selected by the one signal of EN0, EN1, EN2, and EN3 that is active to be set to a 0. The outputs of flip-flops 312, 314, 316, and 318 are signals L0, L1, L2, and L3, respectively.

Figure 3:
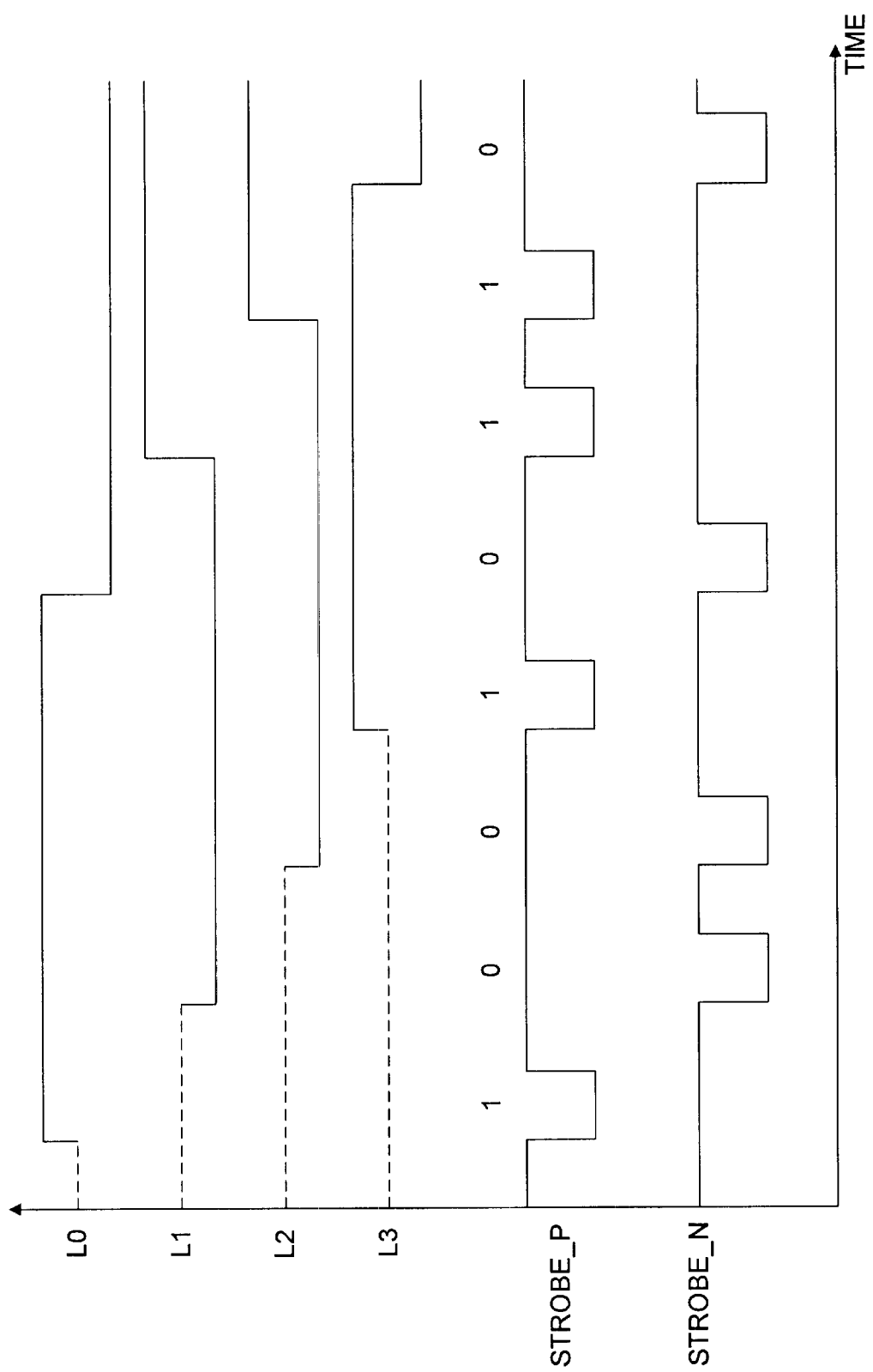
FIG. 3 is a timing diagram giving an exemplary illustration of the operation of the strobes, the data transferred, and the outputs of the circuit shown in FIG. 2.

FIG. 3 is a timing diagram giving an exemplary illustration of the operation of the strobes, the data transferred, and the outputs of the circuit shown in FIG. 2. The dashed lines in FIG. 3 illustrate that signals L0, L1, L2, and L3 are unknown in this diagram before they have been set or reset for the first time. Shown in FIG. 3 is the data stream "10010110" being received. STROBE_P fires each time a data bit with a value of 1 is sent. STROBE_N fires each time a data bit with a value of 0 is sent. As the first data bit is received, STROBE_P sets flip-flop 312 causing L0 to go from an unknown state to a logical 1. As the second data bit is received, STROBE_N resets flip-flop 314 causing L1 to go from an unknown state to a logical 0. As the third data bit is received, STROBE_N resets flip-flop 316 causing L2 to go from an unknown state to a logical 0. As the fourth data bit is received, STROBE_P sets flip-flop 316 causing L3 to go from an unknown state to a logical 1. As the fifth data bit is received, STROBE_N resets flip-flop 312 causing L0 to go from an logical 1 to a logical 0. As the sixth data bit is received, STROBE_P sets flip-flop 314 causing L1 to go from a logical 0 to a logical 1. As the seventh data bit is received, STROBE_P sets flip-flop 316 causing L2 to go from logical 0 to a logical 1. As the eighth data bit is received, STROBE_N resets flip-flop 316 causing L3 to go from a logical 1 to a logical 0.

From FIG. 3, it can be seen that each bit of data is held at the output of the flip-flops for four times the duration of a single incoming data bit. If another flip-flop is added, then the data at the output of each of the flip-flops will be held for an additional duration of an incoming data bit. This allows the data window for the receiving circuit to read the data from the receiver to be as wide as needed. This allows for the receiving circuit to operate at a different clock speed, or to have an internal clock that is uncorrelated with the clock of the sending circuit. Finally, it should be appreciated that the invention translates a serial bit stream to a parallel word with a width corresponding to the number of flip-flops.

Although a specific embodiment of the invention has been described and illustrated, the invention is not to be limited to the specific forms or arrangements of parts so described and illustrated. The invention is limited only by the claims.

What is claimed is:

1. A method for expanding the availability of data transmitted over a bus, said bus comprising a first line and a second line, and data transmitted by generating a first signal differential between said first line and said second line to indicate no data is being sent, generating a second signal differential between said first line and said second line to indicate data having a first value is being sent, and generating a third signal differential between said first line and said second line to indicate data having a third value is being sent, said method comprising:

detecting said first signal differential between said first line and said second line;

subsequent to said detecting said first signal differential, latching a first data value upon subsequent detection of said second signal differential between said first line and said second line or a second data value upon subsequent detection of said third signal differential between said first line and said second line; and actively holding said latched first or second data value beyond a subsequent change in signal differential between said first line and said second line to said first signal differential.

2. A method in accordance with claim 1, comprising:

providing a plurality of N latches;

generating a plurality of N enable signals, each of which corresponds to one of said plurality of N latches;

for each of said N latches:

asserting said corresponding one of said plurality of N enable signals upon an Nth detection of said detecting said first signal differential between said first line and said second line;

deasserting said corresponding one of said plurality of N enable signals upon subsequent detection of a signal differential other than said first signal differential between said first line and said second line; and wherein:

said latching step comprises latching said first data value in said Nth latch when said second signal differential is detected between said first line and said second line or said second data value in said Nth latch when said third signal differential is detected between said first line and said second line; and said holding step comprises actively holding said latched first or second data value in said Nth latch beyond a subsequent change in signal differential between said first line and said second line to said first signal differential.

3. A bus circuit for expanding the availability of data transmitted over a bus, said bus comprising a first line and a second line, comprising:

a bus differential detector which detects a signal differential between said first line and said second line, and which:

asserts a first signal when a first signal differential value is detected and deasserts said first signal when said first signal differential value is not detected, asserts a second signal when a second signal differential value is detected and deasserts said second signal when said second signal differential value is not detected, and asserts a third signal when no signal differential value is detected and deasserts said third signal when either said first or said second signal differential values are detected;

a latch circuit which: latches a first data value when said first signal is asserted and said third signal is deasserted, latches a second data value when said second signal is asserted and said third signal is deasserted, and holds said latched first or second data value when said third signal is asserted.

4. A bus circuit in accordance with claim 3, wherein said latch circuit comprises:

a latch enable circuit responsive to said third signal which asserts a latch enable signal when said third signal is deasserted and deasserts said latch enable signal when said third signal is asserted; and a latch responsive to said first and second signals to latch said first data value when said first signal and said latch enable signal are both asserted or to latch said second data value when said second signal and said latch enable signal are both asserted, and to hold said latched first or second data value when said latch enable signal is deasserted.

5. A bus circuit in accordance with claim 3, wherein said latch circuit comprises:

a latch enable circuit responsive to said third signal which asserts at least one of a plurality of latch enable signals when said third signal is deasserted and deasserts said at least one of said plurality of latch enable signals when said third signal is asserted; and a plurality of latches each responsive to one of said plurality of latch enable signals and to said first and second signals to latch said first data value when said first signal and said one of said plurality of latch enable signals are both asserted, or to latch said second data value when said second signal and said one of said plurality of latch enable signals are both asserted, and to hold said latched first or second data value when said one of said plurality of latch enable signals is deasserted.

6. A bus circuit in accordance with claim 5, wherein:

said latch enable circuit asserts a different one of said plurality of latch enable signals on each successive deassertion of said third signal; and each of said plurality of latches is responsive to a different one of said plurality of latch enable signals.

7. A method for expanding the availability of data transmitted over a bus, said bus comprising a first line and a second line, comprising:

asserting a first signal when a first signal differential value is detected and deasserting said first signal when said first signal differential value is not detected, asserting a second signal when a second signal differential value is detected and deasserting said second signal when said second signal differential value is not detected, asserting a third signal when no signal differential value is detected and deasserting said third signal when either said first or said second signal differential values are detected;

latching a first data value when said first signal is asserted and said third signal is deasserted;

latching a second data value when said second signal is asserted and said third signal is deasserted; and holding said latched first or second data value when said third signal is asserted.

8. A method in accordance with claim 7, comprising:

asserting a latch enable signal when said third signal is deasserted and deasserting said latch enable signal when said third signal is asserted; and latching said first data value when said first signal and said latch enable signal are both asserted;

latching said second data value when said second signal and said latch enable signal are both asserted; and holding said latched first or second data value when said latch enable signal is deasserted.

9. A bus circuit in accordance with claim 7, wherein said latch circuit comprises:

asserting at least one of a plurality of latch enable signals when said third signal is deasserted and deasserting said at least one of said plurality of latch enable signals when said third signal is asserted;

enabling at least one of a plurality of latches with a respective one of said plurality of latch enable signals to latch said first data value when said first signal and said respective one of said plurality of latch enable signals are both asserted, or to latch said second data value when said second signal and said one of said plurality of latch enable signals are both asserted; and disabling said at least one of said plurality of latches to hold said latched first or second data value when said respective one of said plurality of latch enable signals is deasserted.

10. A bus circuit in accordance with claim 9, wherein:

asserting a different one of said plurality of latch enable signals on each successive deassertion of said third signal; and enabling a different one of said plurality of latches with a respective different one of said plurality of latch enable signals.

* * * * *